UNITED STATES PATENT OFFICE.

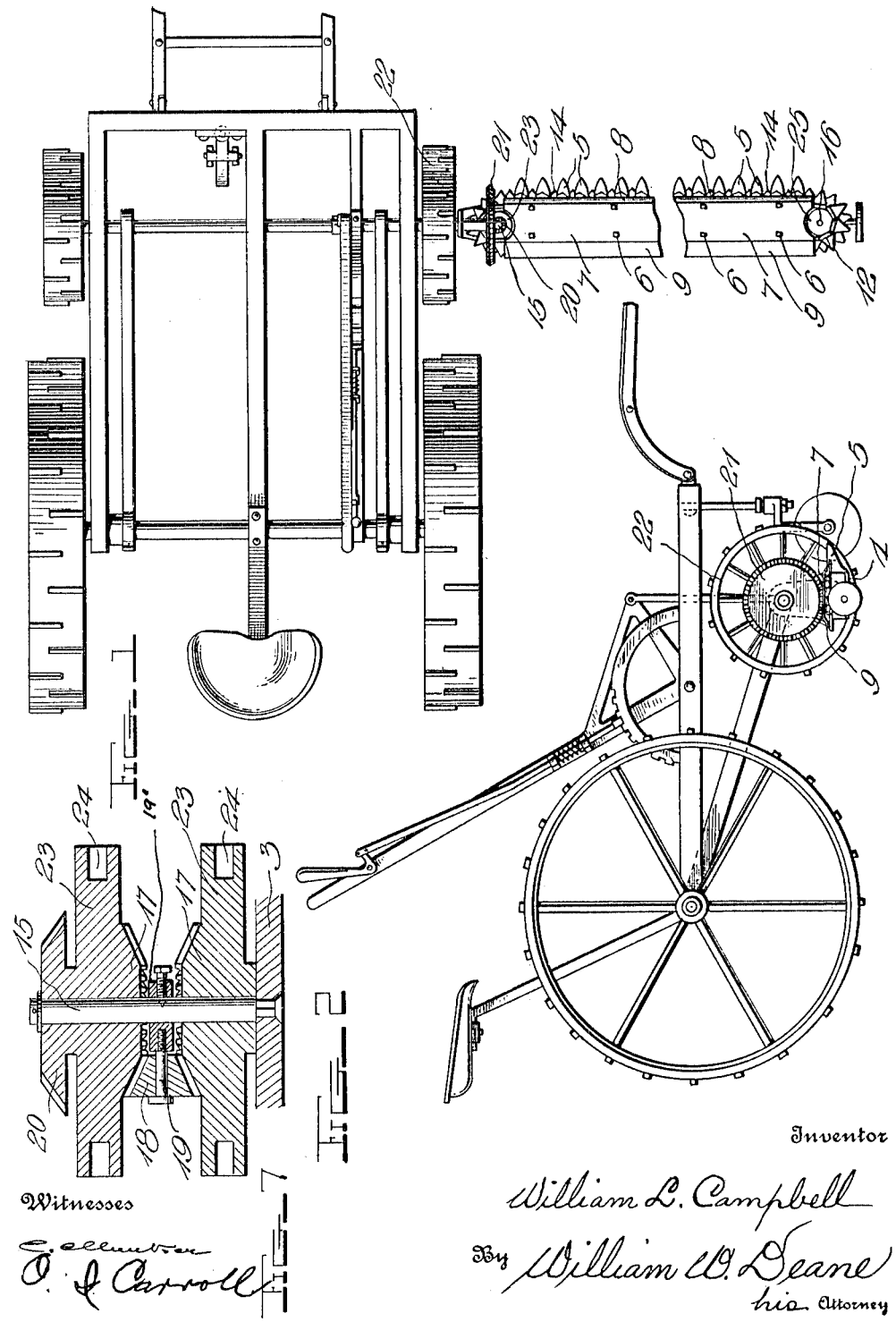

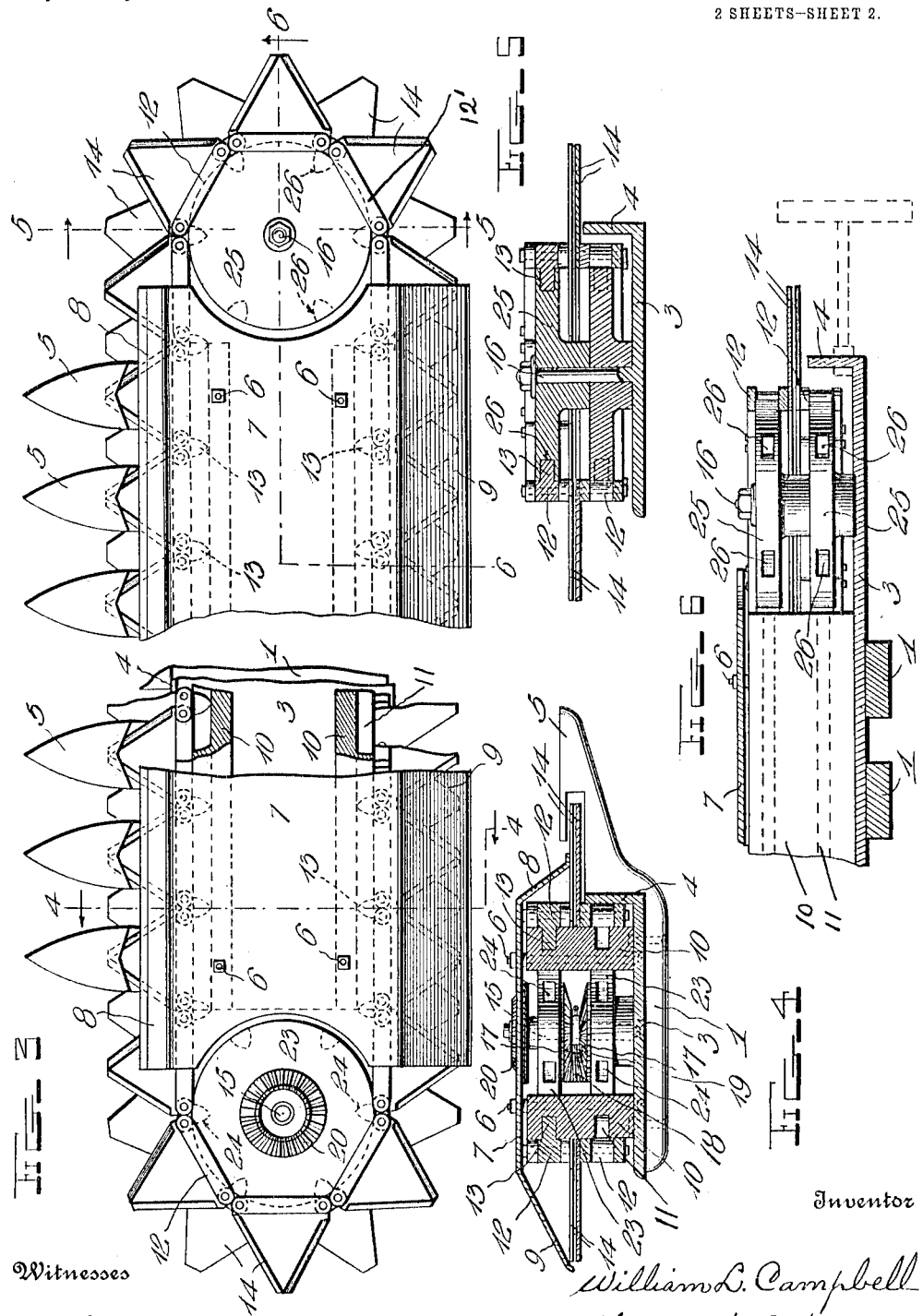

WILLIAM L. CAMPBELL, OF LINCOLN, NEBRASKA.

CUTTING APPARATUS.

1,105,483.　　　　　Specification of Letters Patent.　　Patented July 28, 1914.

Application filed November 27, 1911.　Serial No. 662,731.

*To all whom it may concern:*

Be it known that I, WILLIAM L. CAMPBELL, citizen of the United States, residing at Lincoln, in the county of Lancaster and State of Nebraska, have invented certain new and useful Improvements in Cutting Apparatus, of which the following is a specification.

This invention relates to cutting apparatus for mowers and the like and has for its object to provide a simple and effective mechanism for supporting two series of blades in such manner that they may move in opposite directions with relation to each other; the parts being so arranged that the blades are effectually braced during the cutting operation and there is no possibility for the blades to become disarranged or out of proper alinement as they traverse the length of the cutting apparatus.

For a full understanding of this invention reference is had to the following description and accompanying drawings, in which:

Figure 1 is a plan view of a mower showing the application of my improved cutting apparatus. Fig. 2 is a side elevation of the same. Fig. 3 is an enlarged plan view of the cutting apparatus with parts in section. Fig. 4 is a vertical transverse sectional view of the cutting apparatus taken on the line 4—4 of Fig. 3. Fig. 5 is a similar view taken on the line 5—5 of Fig. 3. Fig. 6 is a detailed vertical longitudinal sectional view taken on the line 6—6 of Fig. 3. Fig. 7 is a transverse sectional view of the means for driving the chains of the cutting apparatus.

Corresponding and like parts are referred to in the following description and indicated in all the views of the accompanying drawings by the same reference characters.

As illustrated in the accompanying drawings the cutting apparatus consists of a bar 3 which is provided at its forward edge with an upturned flange 4. If desired a series of guard fingers 5 may be mounted upon the bar 3, but in carrying out the operation of the essential features of this invention the said guard fingers are not absolutely necessary.

Vertically disposed rods 6 are carried by the bar 3 and upon the upper end portions of the said rods is mounted a plate 7, the said plate having at its forward portion a downwardly disposed section 8 and at its rear portion a downwardly disposed section 9.

Guide blocks 10 are mounted upon the rods 6 between the plate 7 and the bar 3. These blocks are provided at their outer faces with recesses or grooves 11 which extend longitudinally from end to end of the blocks.

Chains indicated in general at 12 are arranged to move along the outer faces of the blocks 10. These chains consist of elongated links 12'. Lugs 13 are located at the ends of the links 12'. Each of the links 12' is provided with a lug 13 and these lugs are adapted to be received within the grooves 11 of the blocks 10 and are adapted to travel along the same so that the inner edges of the long links 12' may bear directly against the outer faces of the blocks 10 as more clearly shown in Fig. 4 of the drawing.

The chains 12 are superimposed with relation to each other and the adjacent long links 12' of the two sets of chains carry blades 14, the inner ends of which are adapted to bear against the outer faces of the blocks 10 as shown in Fig. 4. Means is provided for moving the upper chain in the reverse direction to that in which the lower chain is moved, and the blades 14 are adapted to pass transversely through the guards 5 when the said guards are used. At the rear portion of the cutting apparatus the blades 4 are housed in the section 9 of the plate 7 and at the forward portion of the cutting apparatus the section 8 of the plate 7 is located over the rearmost portions of the blades 14 and prevents the stalks of grain from coming in contact with the forward runs of the chains 12 and the parts supporting the same.

An arbor 15 is mounted upon the bar 3 at the inner portion thereof and an arbor 16 is mounted upon the said bar at the outer end portion thereof. Beveled pinions 17 are journaled for rotation upon the arbor 15 and a beveled pinion 18 is arranged between and meshes with both of the pinions 17. The said beveled pinion 18 is mounted upon a shaft 19 which in turn is carried by a sleeve 19', clamped to the arbor 15, 20 is a bevel gear integral with the upper pinion 17 and which meshes with a bevel gear 21 fixed to the side of one of the traction wheels 22 of the mower and upon which the apparatus is mounted. Wheels or disks 23 are fixed to the beveled pinion 17 and are provided upon their peripheries with recesses 24. Disks or wheels 25 are journaled upon the arbor 16 and are provided at their peripheries with recesses 26. The lugs 13 of the links 12' of the chains 12 are adapted to enter the recesses 24 and 26, when the said links are passing around the wheels or disks 23 and 25. At this time the side members of the pairs of links 12' receive between them the edge portions of the disks 23 and 25 as most clearly indicated in Fig. 3 of the drawings and thus the chains 12 are held in proper alinement with the grooves or recesses 11 in blocks 10 when the said chains are passing around the said disks. As the traction wheel 22 rotates the gear wheel 21, the gear wheel 20 is rotated. The beveled pinion 18 which meshes with the beveled pinion 17 rotates the said pinion in an opposite direction and thus the chains 12 are moved in opposite directions and the blades 14 carried thereby are correspondingly moved in proximity to each other. At the forward runs of the said chains the blades shear the stalks of standing grain and the said stalks pass back over the forward inclined section 8 of the blade 7 and fall upon the ground or upon a suitable conveying mechanism (not shown) for carrying the same to a bundling apparatus should the harvester be provided with such apparatus. During the cutting operation the rear ends of the blades 14 are pressed directly against the outer side of the forward block 10 as are also the links 12' and thus the chains and the blades cannot move rearwardly during the cutting operation and the chains are held in proper alinement with the disks 23 and 25 at the ends of the cutting apparatus.

Having described the invention what is claimed, is:—

In apparatus of the character described, the combination with a relatively stationary vertical shaft, of spaced upper and lower gear wheels rotatably mounted thereon and provided upon their inner faces with bevel gears integral therewith, a sleeve arranged upon the stationary shaft and clamped thereto, a stub-shaft carried by the sleeve, a bevel gear rotatable on the stub-shaft and meshing with the said bevel gears to cause them to rotate in opposite directions, a bevel gear mounted upon the upper face of the upper bevel gear and integral therewith, means to rotate the last named bevel gear, endless chains trained about the gear wheels, and cutting blades attached to the inner adjacent sides of the links of the chains to travel between the spaced gear wheels in close proximity to each other.

In testimony whereof I affix my signature in presence of two witnesses.

WILLIAM L. CAMPBELL. [L. S.]

Witnesses:
H. T. McCaig,
Emma J. Hedges.

---

Copies of this patent may be obtained for five cents each, by addressing the "Commissioner of Patents, Washington, D. C."